(12) United States Patent
Becquerelle et al.

(10) Patent No.: US 6,622,473 B2
(45) Date of Patent: Sep. 23, 2003

(54) SPEED-REDUCING GEAR UNIT TO ABSORB THE AXIAL LOADS GENERATED BY A TURBOJET FAN

(75) Inventors: Samuel Raymond Germain Becquerelle, Le Vesinet (FR); Daniel Victor Marcel Ville, Meudon la Foret (FR)

(73) Assignee: Hispano-Suiza (FR)

( * ) Notice: Subject to any disclaimer, the term of this patent is extended or adjusted under 35 U.S.C. 154(b) by 98 days.

(21) Appl. No.: 10/001,969

(22) Filed: Dec. 5, 2001

(65) Prior Publication Data
US 2002/0069637 A1 Jun. 13, 2002

(30) Foreign Application Priority Data
Dec. 7, 2000 (FR) .............................. 00 15892

(51) Int. Cl.$^7$ ................................ F02K 3/12
(52) U.S. Cl. .............. 60/226.1; 60/793; 74/DIG. 5
(58) Field of Search ................ 60/226.1, 793; 74/DIG. 5

(56) References Cited

U.S. PATENT DOCUMENTS

| 4,380,897 A | | 4/1983 | Zaba |
| 4,651,521 A | | 3/1987 | Ossi |
| 4,969,325 A | * | 11/1990 | Adamson et al. .......... 60/226.1 |
| 5,010,729 A | * | 4/1991 | Adamson et al. .......... 60/226.1 |
| 6,158,210 A | * | 12/2000 | Orlando .................... 60/226.1 |

FOREIGN PATENT DOCUMENTS

DE 341894 10/1921

* cited by examiner

*Primary Examiner*—Ehud Gartenberg
(74) *Attorney, Agent, or Firm*—Bacon & Thomas, PLLC

(57) ABSTRACT

A turbojet engine having a fan (12) driven by a speed-reducing gear unit (23) whose input is driven by a turbine shaft (22). The speed-reducing gear unit (23) includes a planet gear (24) affixed to a turbine shaft (22), a ring gear (28) joined to a fan shaft (12) and a plurality of satellite gears (25) mounted on a stationary satellite support (27) and having helical teeth which operatively engage with helical teeth of the ring gear and the planet gear to balance axial loads along the turbine shaft and the fan shaft.

3 Claims, 2 Drawing Sheets

SPEED-REDUCING GEAR UNIT TO ABSORB THE AXIAL LOADS GENERATED BY A TURBOJET FAN

BACKGROUND OF THE INVENTION

The invention relates to aircraft bypass gas-turbine engines.

More specifically this invention relates to a turbojet engine having a fan driven into rotation by a speed-reducing gear unit whose input is driven by a turbine shaft. The speed-reducing gear unit includes a planet gear affixed to the turbine shaft, a ring gear affixed to the fan and a plurality of satellite gears in operative engagement with the planet and ring gears. The plurality of satellite gears are mounted on a satellite-gear support affixed to the engine casing.

In order to achieve ever higher pressures, turbojet engines are designed with large suction inlets. Accordingly, fan blade sizes increase while being constrained by the critical speed of the blade tips. This criterion is the product of the fan radius and its rotational speed, and if the radius is increased while maintaining a constant circumferential speed of the blade tips, then the speed of rotation of a fan must be reduced. For that reason, a speed-reducing gear unit is mounted between the turbine shaft and the fan shaft.

Aerodynamic loads generated by the slant of fan blades generate axial loads which are absorbed by engine bearings and the engine casing. As the fan diameter is increased, these loads substantially rise and become difficult to control. Accordingly, both the diameter and the weight of the bearings absorbing these loads are increased, resulting in problems in integrating these components into the engine.

SUMMARY OF THE INVENTION

The objective of the invention is to create a turbojet engine of the kind cited above wherein the axial loads absorbed by the fan bearings are decreased.

The objective of the invention is realized in that the satellite gears include helical teeth that mesh with helical teeth of the ring gear such that the speed-reducing gear unit generates axial loads on the ring gear which partly compensate for the axial loads generated by the fan.

The dimensions of the fan bearings are selected such that they absorb the differential of the axial loads generated by the fan and by the speed-reducing gear unit.

The generation of axial loads along the periphery of the speed-reducing gear unit results in a tipping torque near each satellite gear. In order to compensate for this torque, an opposing torque is generated by radial loads located near the contacts between the satellite gears and the ring and planet gears, by constraining an axial offset between the mean positions of the ring gear and the planet gears.

In a very advantageous manner, the helical satellite-gear teeth cooperate with the helical teeth of the planet gear and results in the speed-reducing gear unit applying axial loads on the planet gear which partly compensate for the axial loads produced by the turbine.

In this manner the absorbed loads by the turbine bearings are reduced.

Accordingly, the satellite gears apply first axial loads to the ring gear and second axial loads—which are oppositely directed and substantially equal to the first ones—to the planet gear, the resultant of the first and second axial loads applied to the shafts of the satellite gears, being substantially zero.

Other advantages and features of the invention are elucidated in the following illustrative description and in relation to the attached drawings.

DESCRIPTION OF THE PREFERRED EMBODIMENT

Figure 1:
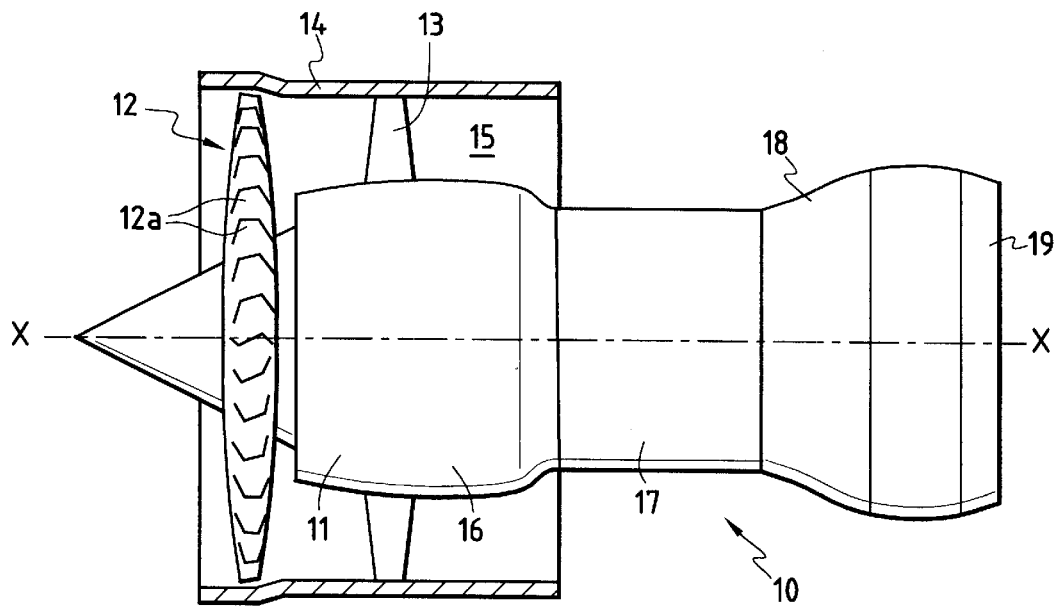
FIG. 1 is a schematic view of a bypass turbojet engine of the invention.

FIG. 1 shows a bypass turbojet engine 10 having an axis XX and comprising a fan 12 located at the front of an inner casing of the engine 11. The fan 12 is enclosed by an outer, annular casing 14, which jointly with the inner casing 11, subtends an annular duct 15 which is crossed by braces 13 connecting the casings 11, 14.

The air flow applied by the blades of the fan 12 is divided into two flows, namely a bypass flow through the annular duct 15 and a primary flow through the engine. The primary flow is compressed in a section of the compressor 16 before being mixed with fuel in order to be burnt in a combustion chamber 17. The hot combustion gases move through a section of the turbine 18 which drives the section of the compressor 16 and the fan 12 and then are exhausted through the nozzle 19.

Figure 2:
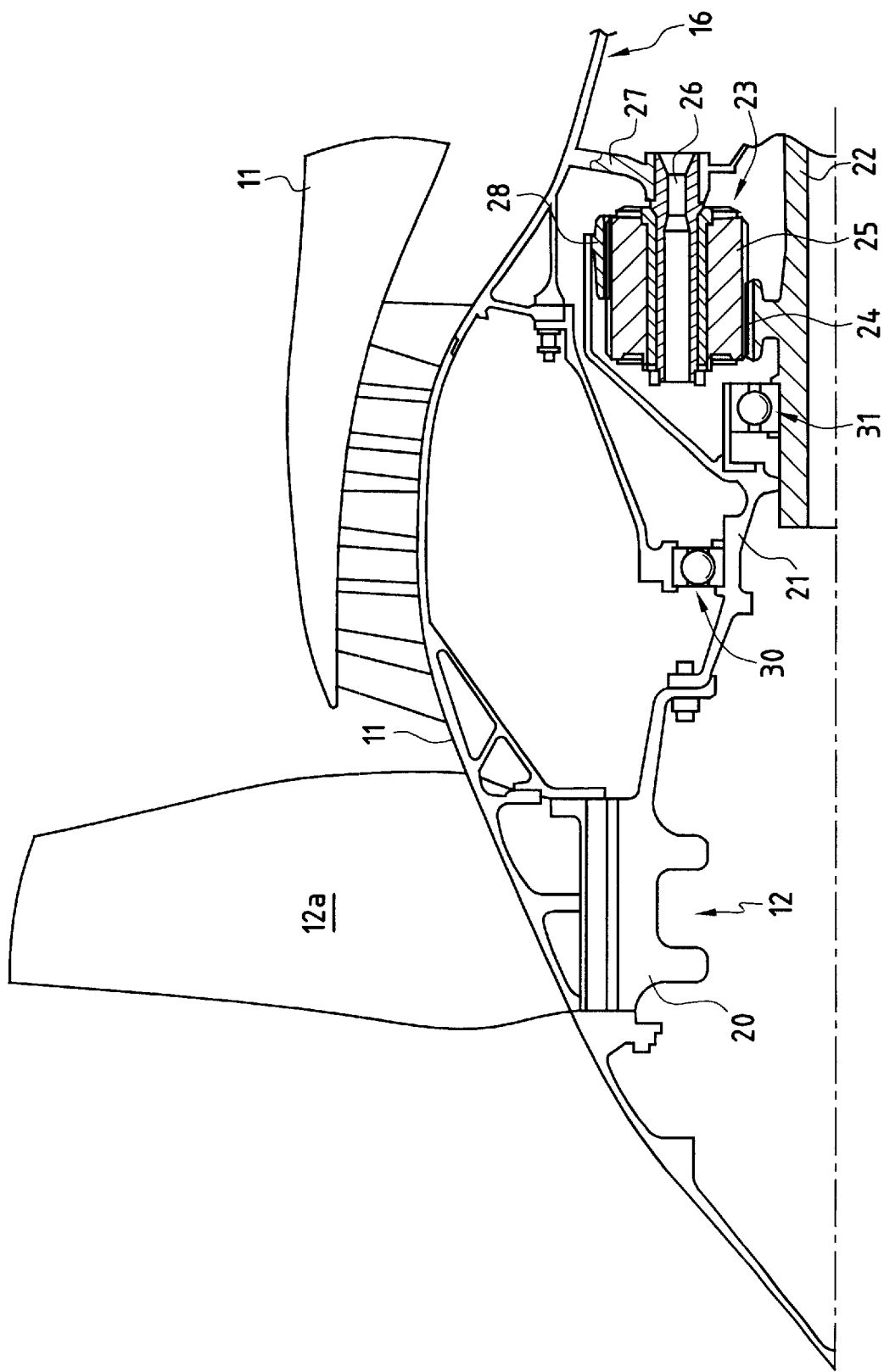
FIG. 2 is a sectional schematic view of the turbojet engine having the speed reducing gear unit used in this invention.

As shown in greater detail in FIG. 2, the blades 12a of the fan 12 are mounted on a rim of the rotor 20 rotationally driven by a shaft of the fan 21. The shaft of the fan 21 is driven by the shaft of the turbine 22 with interposition of a speed-reducing gear unit 23. The shafts of the fan 21 and of the turbine 22 rotate in opposite directions, respectively.

The speed-reducing gear unit 23 comprises a planet gear 24 having an axis XX and configured around the turbine shaft 22 to which it is affixed, and further comprises a plurality satellite gears 25 mounted on shafts 26 which are affixed to a satellite-gear support 27 affixed to the inner casing 11, and a ring gear 28 enclosing the satellite gears 25. The ring gear 28 is mounted within the inner bore of the fan shaft 21.

The satellite gears 25 are interposed between the planet gear 24 and the ring gear 28 and mesh with latter by means of helical teeth. The axial range of the teeth on the satellite gears 25 is greater than the teeth of the planet gear 24 and of the ring gear 28. The ring gear 28 meshes with the satellite gears 25 at a downstream end of the satellite gears, whereas the planet gear 24 meshes with the satellite gears 25 at an upstream end of the satellite gears. "Upstream" and "downstream" are relative to the gas flow through the fan 12.

Figure 3:
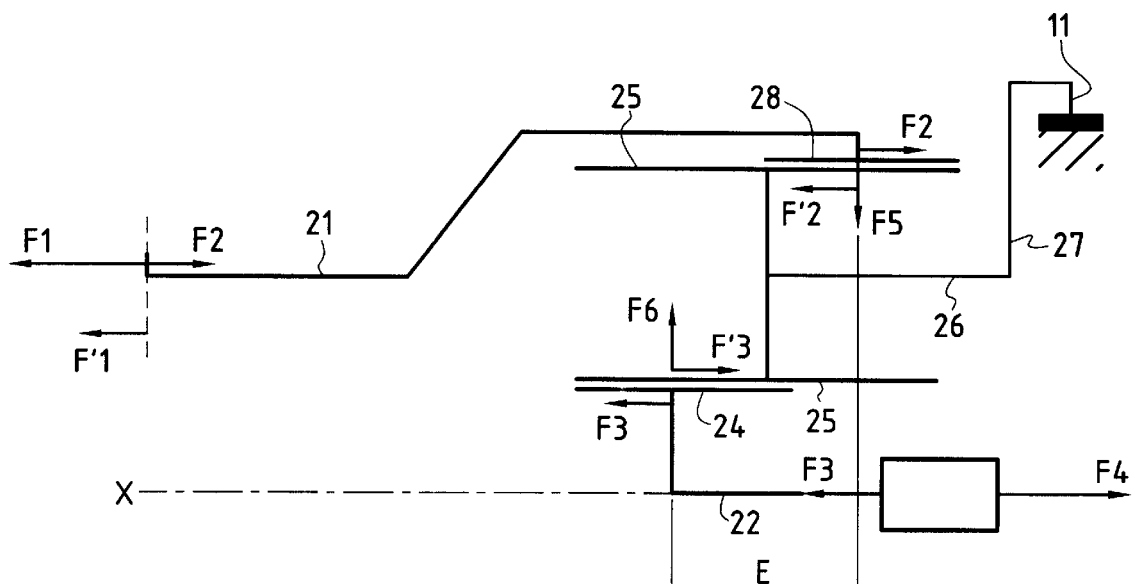
FIG. 3 is a schematic drawing of the speed reducing gear unit of this invention.

The direction of the helical teeth of the satellite gears 25 is such that, in operation, the satellite gears 25 apply a downstream axial force F2 (FIG. 3) to the ring gear 28 and an axially upstream force F3 to the planet gear 24. Preferably the axial forces F2 and F3 are substantially equal so that their resultant, which is absorbed by the shafts 26, be as small as possible.

The axial force F2 is opposite the axial force F1 generated by the fan 12. The reference F'1 shows the axial resultant of these two forces which must be absorbed by the bearing 30 which is interposed between the fan shaft 21 and the inner casing 11, and by the bearing 31 interposed between the fan shaft 21 and the upstream end of the turbine shaft 22. The axial force F3 points opposite the axial force F4 applied by the turbine driving the turbine shaft 22.

In reaction, the ring gear 28 and the planet gear 24 apply equal and opposite forces F'2 and F'3 to the satellite gears 25, the forces F'2 and F'3 applying a tipping torque to each satellite gear 25. The references F5 and F6 denote the radial forces applied at the meshing sites to compensate the tipping torque generated by the axial forces F2 and F3. The forces F5 and F6 usually will be equal and opposite. Furthermore, they may be reduced as the axial gap E between the mean positions of the planet gear 24 and the ring gear 28 is increased.

The invention offers the advantage of substantially decreasing the axial loads absorbed by the bearings of the fan 12 and consequently leading to retaining bearing compactness and weight reduction which can be more easily incorporated into an engine.

A planetary speed-reducing gear unit moreover allows counteracting the axial loads F4 generated by the turbine and consequently decreasing the bulk and weight of the turbine-supporting bearings.

We claim:

1. A turbojet engine having an engine casing, a fan and a speed reducing gear unit operatively connected to a turbine shaft and constructed to rotatably drive a fan shaft connected to said fan, said speed reducing gear unit comprising:

a planet gear fixed to said turbine shaft for rotation therewith;

a satellite gear support fixed to said engine casing;

a plurality of satellite gears having helical teeth and mounted to said satellite gear support in operative engagement with said planet gear; and a ring gear having helical teeth and fixed to said fan shaft for rotation in operative engagement with said satellite gears;

wherein said helical teeth of said satellite gears and said ring gear cooperate to balance an axial load distribution along said fan shaft; wherein each of said plurality of satellite gears has an upstream end and a downstream end located along an axis of rotation about said satellite gear support, said planet gear engaging with said satellite gears at said upstream end, and said ring gear engaging with said satellite gears at said downstream end, said planet gear and said ring gear being axially spaced from one another in relation to respective operative engagement with said satellite gears.

2. The turbojet engine according to claim 1 wherein said planet gear includes helical teeth that cooperate with said helical teeth of said satellite gears to balance an axial load distribution along said turbine shaft.

3. The turbojet engine according to claim 1 wherein said planet gear includes helical teeth that cooperate with said helical teeth of said satellite gears to balance an axial load distribution along said turbine shaft.

* * * * *